United States Patent [19]
Sharp

[11] 3,854,806
[45] Dec. 17, 1974

[54] PHOTOGRAPHIC APPARATUS FOR USE WITH A FILM HANDLING CASSETTE HAVING FILM STRIP TENSION REGULATING MEANS THEREIN

[75] Inventor: John R. Sharp, Squantum, Mass.

[73] Assignee: Polaroid Corporation, Cambridge, Mass.

[22] Filed: Sept. 4, 1973

[21] Appl. No.: 393,884

Related U.S. Application Data

[63] Continuation-in-part of Ser. No. 214,548, Jan. 3, 1972, Pat. No. 3,756,707.

[52] U.S. Cl. .................................. 352/130, 352/72
[51] Int. Cl. .......................................... G03b 23/02
[58] Field of Search .............. 352/72, 78, 130, 159; 226/25, 180, 195; 242/75.3

[56] References Cited
UNITED STATES PATENTS

| | | | |
|---|---|---|---|
| 3,065,890 | 11/1962 | Fox | 352/159 X |
| 3,589,807 | 6/1971 | Penfield | 242/73.3 X |
| 3,608,455 | 9/1971 | Downey | 352/78 X |
| 3,643,579 | 2/1972 | Downey et al. | 352/78 R |
| 3,643,891 | 2/1972 | Isbell | 352/72 |
| 3,656,674 | 4/1972 | Morse | 226/195 |

*Primary Examiner*—Samuel S. Matthews
*Assistant Examiner*—Alan Mathews
*Attorney, Agent, or Firm*—John S. Vale

[57] ABSTRACT

A motion picture apparatus, preferably a projector, including a device for immobilizing a film tension regulator forming part of a multi-purpose film handling cassette that is adapted to be received and supported in the apparatus. The tension regulator is movably mounted and reciprocates while in engagement with the film strip to maintain a feed loop of film within the cassette. A processing station is also provided within the cassette for coating the film strip with fluid processing composition to initiate a development and diffusion transfer process. The immobilizing device prevents the tension regulator from moving during the film coating process to assure that it does not adversely affect the coating.

8 Claims, 10 Drawing Figures

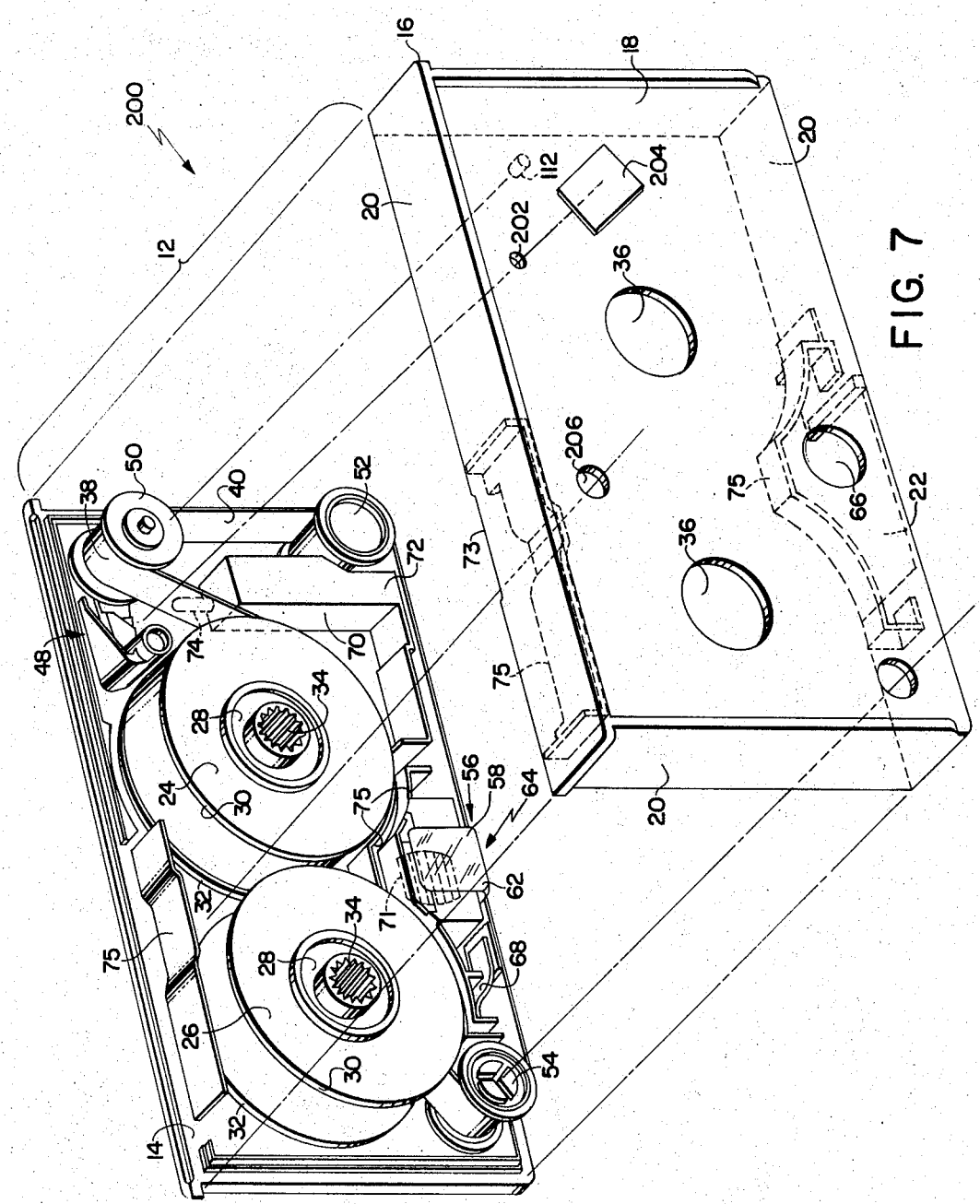

PHOTOGRAPHIC APPARATUS FOR USE WITH A FILM HANDLING CASSETTE HAVING FILM STRIP TENSION REGULATING MEANS THEREIN

CROSS-REFERENCE TO RELATED APPLICATION

This application is a continuation-in-part of my copending application, Ser. No. 214,548, filed Jan. 3, 1972, which is entitled "Photographic Film Handling Cassette" (now U.S. Pat. No. 3,756,707).

BACKGROUND OF THE INVENTION

1. Field of the Invention

The present invention relates to the field of photography and, more particularly, to a multi-purpose film handling cassette including a film strip tension regulating member and photographic apparatus for use with such a cassette.

2. Description of the Prior Art

Recently, self-developing film handling systems have been developed which feature a multi-purpose film handling cassette which may be mounted in a motion picture camera for exposing a film strip contained therein and then may be immediately transferred to a motion picture projector for processing and projecting the film strip without having to remove it from the cassette.

The cassette includes a combination exposure and projection station past which incremental sections of the film strip may be progressively transported by film transport mechanism mounted in the camera and projector. Typically, the film strip is stored on supply and take-up reels within the cassette and includes sprocket holes which may be engaged by a reciprocally driven claw mechanism for advancing the film from the supply reel to the exposure and projection station.

Processing is accomplished by transporting the exposed film strip past a cassette processing station during its initial rewind from the take-up reel to the supply reel where a thin coating of liquid processing composition is applied to the film strip to develop latent images formed in its photosensitive emulsion.

Exemplary of such self-developing systems are those described in U.S. Pat. No. 3,615,127 issued to Edwin H. Land on Oct. 26, 1971; U.S. Pat. No. 3,597,062 issued to Rogers B. Downey on Aug. 3, 1971; and U.S. Pat. No. 3,537,784 issued to Rogers B. Downey on Nov. 3, 1970; all of which are assigned to the same assignee as the present invention.

It is desirable to provide such multi-purpose film handling cassettes with a film strip tension regulating device for establishing a feed loop of film strip between the supply reel and combination exposure and projection station. The function of the feed loop is to isolate that portion of the film strip which is engaged by the claw mechanism near the exposure and projection station from the tension induced in the film strip by the inertia of the supply reel thereby preventing the claw mechanism from applying excessive pressure to the sprocket holes and assuring smooth transport of an incremental section of the film strip to its exposure or projection position. It is also preferable that the tension regulator be configured to guide the liquid treated film strip onto the supply reel during the processing mode of operation.

In designing a tension regulator suitable for incorporation into a multi-purpose film handling cassette, consideration must be given to such special requirements as the performance of the regulator during the processing mode of operation and space limitations within the cassette housing for accommodating the regulator.

During the processing mode of operation, the exposed film strip is transported past the processing station at a fairly rapid rate to insure that the liquid processing composition is applied uniformly. Typically, a fifty foot length of film strip may be coated in approximately 10 seconds. It is during this rapid rewind that tension within the film strip builds up to a maximum. Therefore, the regulator and its mounting must be designed to endure significant stress levels and yet remain stable so as not to disturb the liquid processing composition during rewind.

The limitation on space within the cassette housing is imposed by the processing station which is preferably located between the supply reel and the combination exposure and projection station. Therefore, it is desirable to provide a tension regulator which is compact and may be readily mounted in a relatively small space.

In terms of manufacturability and economics, it is also preferable that the tension regulator be designed to lend itself to molded plastic construction and automated assembly and mounting techniques.

The prior art discloses a number of film handling cassettes including film tension regulators which typically take the form of spring biased idlers or elongated leaf springs. The regulators are mounted for movement between initial and energized positions by the advancing film strip to repeatedly form a feed loop of film strip between the supply reel and the cassette exposure or projection station. Examples of these prior art film handling cassettes may be found in U.S. Pat. Nos. 2,119,375 and 2,159,998.

Generally, the type of tension regulators disclosed in the above-mentioned U.S. Patents have characteristics which limit their suitability for incorporation into a multi-purpose self-developing film handling cassette. For example, the leaf spring regulators are relatively long and the amount of space required within the cassette housing for its movement between initial and energized positions is excessive. Neither type of regulator is well suited for processing operations since they are not equipped with means for stabilizing the regulator during rapid rewind nor do they include provisions for engaging a liquid coated film strip in a manner which would preclude disturbing the coating. Furthermore, both types of regulators do not lend themselves to molded plastic construction and automated assembly since they obviously utilize metal springs and are adapted to be secured to the cassette housing with conventional fasteners such as screws and rivets.

SUMMARY OF THE INVENTION

My copending application, Ser. No. 214,548 U.S. Pat. No. 3,756,707, is directed to a multi-purpose film handling cassette which has a completely self-contained film strip tension regulator enclosed by the cassette housing.

The present invention relates to motion picture apparatus, preferably a motion picture projector or viewer, having means therein for immobilizing a film strip tension regulator, of simplified design, in such a cassette housing. The immobilizing device stabilizes the tension regulator during the film processing cycle to assure that the tension regulator does not induce vibrations or erratic motion in the film strip which may adversely affect the coating of fluid processing composition as it is applied to an elongated portion of the film strip at the processing station.

In the previously described cassette (disclosed in my copending application, Ser. No. 214,548), the tension regulator includes a pivot arm having an integrally formed roller bearing near one end, a roller mounted on the roller bearing around which the film strip is adapted to pass, an integrally formed mounting bearing near the opposite end of the pivot arm, and an integrally formed resilient blade extending from the mounting bearing at an acute angle to the pivot arm towards the roller bearing. The cassette housing, which is also preferably formed of a plastic material, includes an integrally formed pivot arm mounting post for receiving the pivot arm mounting bearing, a first stop against which the resilient blade is positioned to locate the tension regulator in its initial position, and a second stop against which the pivot arm may be positioned to locate the tension regulator in a stabilized terminal position.

During exposure and projection modes of operation, the regulator is initially positioned such that the roller supports a portion of the film strip in position to form a feed loop between the cassette supply reel and combination exposure and projection station. As a length of film strip is advanced from the feed loop to the exposure and projection station, the length of the feed loop decreases causing the film strip to deflect the pivot arm against the bias of the resilient blade from the initial position to an energized position. While the film strip is held at its exposure or projection position, the energy stored in the resilient blade causes the pivot arm to return to its initial position thereby causing the roller to replenish the feed loop by drawing a length of film strip from the supply reel.

During the rapid rewind processing operation, the relatively high tension in the film strip deflects the tension regulator from its initial position to a terminal position wherein the pivot arm bears against the second stop thereby stabilizing the tension regulator such that the roller may guide the liquid coated film strip onto the supply reel without disturbing the coating. The hub section of the roller is also configured to include a recessed portion such that the film strip may pass around the roller with the liquid coating facing inwardly toward the roller hub.

The present invention provides a motion picture apparatus for receiving a cassette having a simplified tension regulating device. The cassette does not include the second stop for stabilizing or immobilizing the tension regulator. The means for immobilizing the tension regulator is, instead, mounted in the projector.

This arrangement not only permits a manufacturing cost reduction for the cassette, but it allows the immobilizing means to be constructed of structurally superior material (metal not plastic) and allows for more accurate placement of the immobilizing device relative to the tension regulator and cassette locating surfaces within the projector.

Therefore, it is an object of the present invention to provide a motion picture apparatus, preferably in the form of a projector, which includes means for immobilizing a tension regulator in a multi-purpose film handling cassette to facilitate a film processing operation wherein an elongated portion of the film strip is advanced past a processing station in the cassette to have a fluid coating applied thereto to initiate a film diffusion transfer process.

It is another object of the present invention to provide a multi-purpose film handling cassette including a film strip tension regulator which is adapted to form a feed loop of film strip intermediate the cassette supply reel and combination exposure and projection station to facilitate film exposure and projection operations and is configured to serve as a stabilized guide for guiding a liquid treated film strip onto the supply reel to facilitate film processing operations.

It is another object of the present invention to provide a multi-purpose film handling cassette of the aforementioned type having a compact film strip tension regulator which lends itself to molded plastic construction and automated assembly and mounting within the cassette.

It is yet another object of the present invention to provide a multi-purpose film handling cassette including a housing, a film strip stored on a reel within the housing, means providing access for light rays to be directed towards an incremental section of the film strip as the film strip is progressively transported past the access means in a first direction for exposure or projection, a processing station past which the film strip may be progressively transported in a second direction for coating the film strip with a liquid processing composition, and a tension regulator which is configured for reciprocating movement between initial and energized positions in response to progressively transporting the film strip in the first direction for continuously forming a feed loop of film strip and is also configured for movement from the initial position to a stabilized terminal position in response to progressively transporting the film strip in the second direction for guiding the liquid coated film strip onto the reel.

It is another object of the invention to provide a film strip tension regulating system adapted to be engaged by a film strip to exert a first maximum amount of force thereon during first film handling operations in which the film strip is progressively advanced therepast and a second amount of force greater than the first maximum amount of force during second film handling operations at which the film strip is progressively advanced therepast.

Another object of the invention is to provide an improved film strip tension regulating device which includes an arm mounted for movement between initial and energized positions, a roller rotatably mounted on the arm and around which a film strip is adapted to pass and a resilient blade for biasing the arm to its initial position.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 7 is an exploded perspective view of an alternative embodiment of the cassette shown in FIG. 1, the cassette does not include a stop for immobilizing the tension regulator but rather it includes an access opening through which a stop, mounted in a motion picture apparatus, may be inserted to immobilize the tension regulator;

DESCRIPTION OF THE PREFERRED EMBODIMENT

Figure 1:
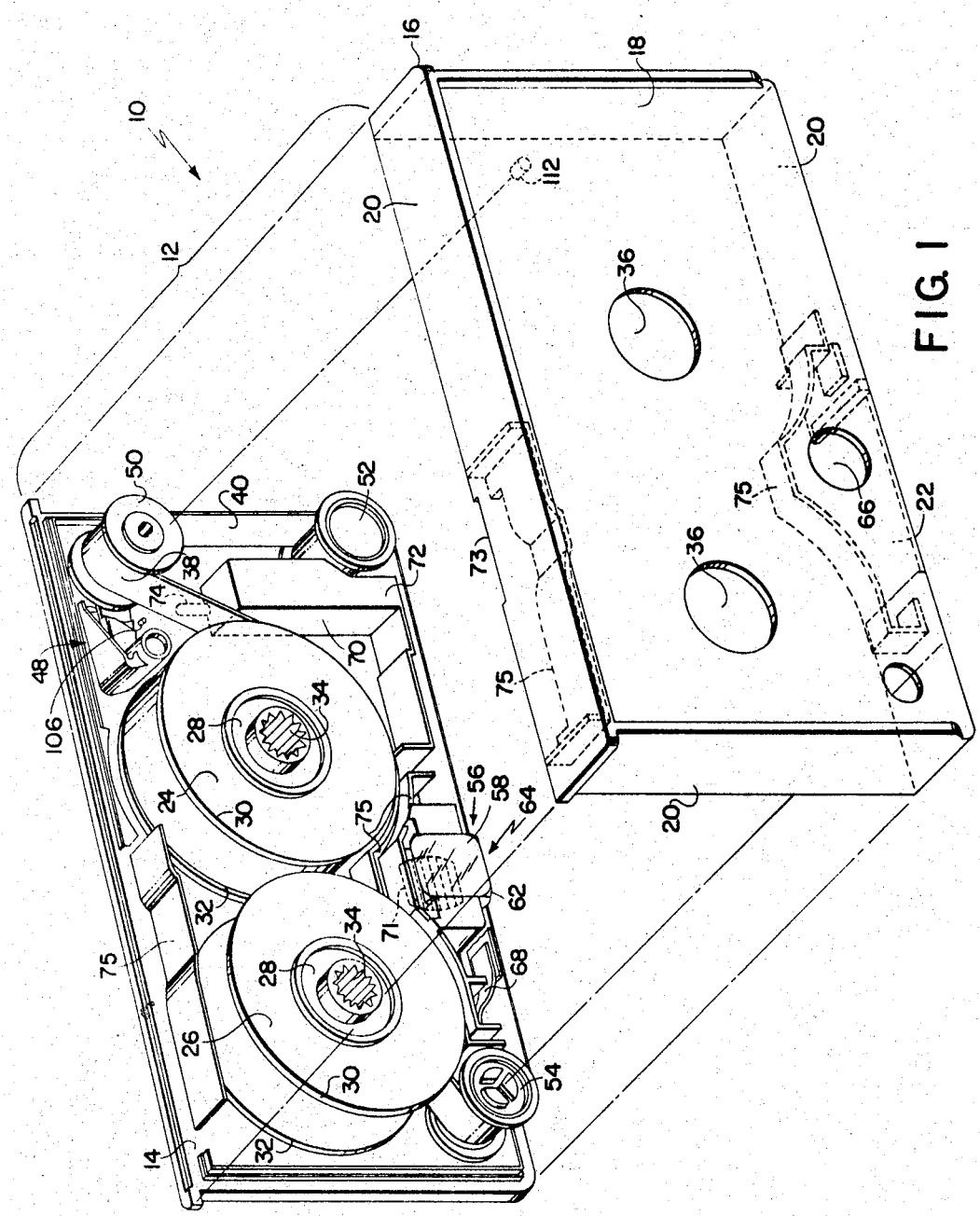
FIG. 1 is an exploded perspective view of a multi-purpose film handling cassette having a self-contained film tension regulator and showing the arrangement of its component parts within the cassette housing.

A preferred embodiment of this invention is illustrated as applying a compatible processing fluid to a film structure which comprises both a photosensitive image recording layer and an image receiving layer in which a visible image may be formed by image forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black and white images, a silver halide developer and a silver halide solvent are applied in an aqueous alkaline solution to a photo exposed silver halide stratum or emulsion where they develop exposed silver halide to silver and react with unreduced silver halide to form a soluble silver complex. This complex, in order to form a positive print, is transferred and reduced to silver on a silver receptive stratum on which the silver halide stratum has been superposed. It has generally been the practice, in the completion of this process, to separate the silver receptive and silver halide strata in order to render the positive image visible, particularly when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver to deposit upon it, in comparison with silver developed in the silver halide stratum, to possess very high covering power, i.e., opacity for a given mass of reduced silver. If the silver halide is in such a concentration as to give rise when fully developed to a predetermined low maximum density, and if the silver complex is reduced to silver in a vigorous silver precipitating environment, the resulting negative and positive images in superposition provide a composite that represents a good positive image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black and white image which can be viewed by transmitting light without the necessity of removing the processed, negative image containing photosensitive layer are shown in prior U.S. Pat. No. 2,861,885 of Edwin H. Land and which issued on Nov. 25, 1958. Other composite film assemblies capable of producing photographic records which can be exhibited in full color without the necessity of removing the processed photosensitive layer as shown in prior patents of Edwin H. Land, U.S. Pat. No. 2,726,154, issued Dec. 6, 1955 and U.S. Pat. No. 2,944,894, issued July 12, 1960. All of these prior patents are assigned to the same assignee of the present invention.

However, it should be noted that the present invention is not directed to the chemistry by which visible images are formed in an exposed photosensitive material and/or formed in an image receiving stratum associated therewith. While an illustrative preferred embodiment of the invention is shown applying a compatible processing fluid to a film structure not requiring the removal of the photosensitive layer after visible image formation is completed, the invention itself is also applicable for use with other types of processing fluids and film structures.

Referring now to FIG. 1 of the drawings, a multi-purpose film handling cassette is generally shown at 10. Cassette 10 includes a substantially rectangular parallelepiped shaped housing 12 formed of any suitable opaque material, for example, a thermoplastic such as polystyrene. As best shown in FIG. 1, housing 12 includes a generally rectangular base section or side wall 14 for supporting various cassette components and a mating cover 16 for enclosing those components. Cover 16 includes a generally rectangular side wall 18 and an integrally formed peripheral wall 20 which serves to space side walls 14 and 18 in parallel relation to one another. A generally rectangular opening 22 is provided in peripheral wall 20 and serves as a film gate for providing access to the film strip during exposure and projection modes of operation. Thus, cassette 10 is provided with means for providing access for image carrying light rays to an incremental section of the film strip to facilitate film exposure operations and means for providing access for light rays from an externally mounted projection lamp to be directed through an incremental section of the film strip to facilitate film projection operations.

A supply reel 24 and a take-up reel 26 are rotatably mounted on a pair of axles (not shown) integrally formed with side wall 14 and disposed such that reels 24 and 26 may be located in side by side coplanar relation with their respective axes of rotation substantially normal to side walls 14 and 18. Reels 24 and 26 are of the conventional type and include a central hub section 28, top and bottom guide flanges 30 and 32 extending radially from hub section 28, and a central recess 34 accessible through holes 36 in cover 16 for receiving appropriate reel drive shafts mounted in both the motion picture camera and projector.

Figure 6:
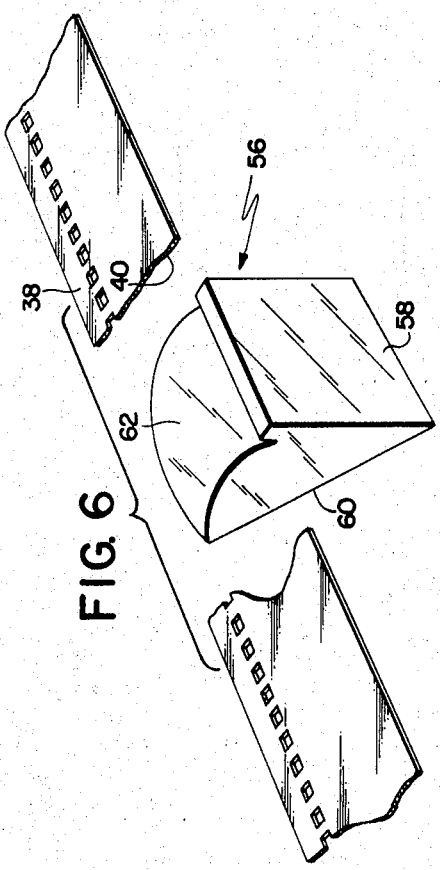
FIG. 6 is a perspective view of a light-reflecting prismatic lens associated with the multi-purpose cassette and a portion of a film strip adapted to be projected by light transmitted through the lens.

Having one end thereof attached to the hub section 28 of supply reel 24 and the opposite end thereof attached to the hub section 28 of take-up reel 26 is a length of unexposed photographic film strip 38. Film strip 38 is of the type previously described and includes a photosensitive emulsion 40 on one side and a series of sprocket holes 42 adjacent one lateral edge, as best shown in FIG. 6, which are adapted to be engaged by claw transport mechanisms positioned in the camera and projector to extend through opening 22.

Initially, substantially the entire length of the unexposed film strip 38 is stored on supply reel 24 with its photosensitive emulsion side 40 facing outwardly away from hub section 28. The means for establishing a path of travel for film strip 38 from the supply reel 24 past opening 22 to the take-up reel 26 include a tension regulator 48 (to be described hereinafter) formed in part by a roller or idler 50 positioned near a first corner of housing 12, and rollers or idlers 52 and 54 positioned near the next two successive corners of housing 12, respectively, on opposite sides of opening 22 in peripheral wall 20. It will be noted that film strip 38 passes around rollers 50, 52, and 54 with emulsion side 40 facing inwardly towards the roller hubs such that film strip 38 is presented at opening 22 with emulsion side 40 facing inwardly towards the interior of cassette housing 12. Preferably, during transport of the film strip from supply reel 24 to take-up reel 26, the take-up reel 26 is driven in a counterclockwise direction (as viewed in FIG. 1) such that the film strip 38 may also be stored on the take-up reel 26 with its emulsion side 40 facing outwardly from hub section 28.

To facilitate projection of film strip 38 at opening 22, cassette 10 is provided with a light-reflecting element which in the preferred embodiment may take the form of a molded plastic prismatic lens 56. As best shown in FIG. 6, prismatic lens 56 includes a substantially flat, transparent, light receiving surface 58 and a substantially flat reflecting surface 60 which reflects light, transmitted into lens 56 through surface 58, outwardly through convex transparent surface 62 onto an incremental section of film strip 38 positioned at opening 22. A prismatic lens of this type suitable for use in connection with the present invention is described in copending application Ser. No. 214,591, filed on even date herewith by Philip G. Baker and is assigned to the same assignee as the present invention.

As best seen in FIG. 1, prismatic lens is adapted to be mounted on side wall 14 intermediate idlers 52 and 54 such that surface 62 is in alignment with opening 22 to form a combination exposure and projection station 64 therebetween. Also, light receiving surface 58 is aligned with an opening 66 in cover 16 through which light from a projector lamp is directed for transmission into lens 56. It will also be noted that cassette 10 may be provided with a spring biased film pressure plate 68 which is adapted to cooperate with camera and projector aperture plates for accurately locating film strip 38 with respect to station 64.

As noted earlier, subsequent to the exposure of film strip 38, the emulsion side 40 is adapted to be coated with a liquid processing composition for developing latent images therein by a diffusion transfer process. For this purpose, cassette 10 is provided with a normally inoperative processing station formed by a processing fluid dispenser 70 supported by side wall 14 with its lower applicator end 72 located adjacent the path of travel of emulsion side 40 intermediate opening 22 and roller 52. Dispenser 70 includes a container having therein a supply of viscous developing fluid. The lower applicator end 72 includes an orifice which acts as a nozzle for feeding a doctor blade to supply a carefully measured thickness of the viscous film processing fluid to the emulsion side 40 of film strip 38. A rupturable membrane is provided across the orifice to render the dispenser inoperative. Dispenser 70 also includes a plunger 74 which is operable to apply pressure to the fluid within the container during the processing mode of operation. The pressure causes the membrane to rupture thereby permitting the fluid to flow through the orifice across the doctor blade for application to the film strip as it is transported past the doctor blade during its initial rewind onto supply reel 24. Such a processing system is described in U.S. Pat. No. 3,615,127. However, it is within the context of the present invention to utilize other processing systems within cassette 10 such as the one disclosed in copending application Ser. No. 227,092 (now U.S. Pat. No. 3,785,725) filed on Feb. 17, 1972 by John F. Batter, Jr., et al.

Drying of the liquid coated film strip may be facilitated by blowing air through the cassette housing during processing and/or projection modes of operations. For this purpose, an air inlet 71 in side wall 14 and an air outlet 73 in peripheral 20 are provided to establish an air flow path therebetween across reels 24 and 26. Air inlet 71 is positioned near prismatic lens 56 and directs air from a blower mounted in the projector such that the air flows over a portion of the lens for simultaneously cooling the lens which tends to be heated by the projection lamp and heating the incoming air to enhance drying of the liquid treated film strip 38. Baffles 75 may be integrally formed with sidewalls 14 and 18 such that they cooperate to form light sealing and air distributing labyrinths between the air inlet 71, air outlet 73 and the reels 24 and 26. A detailed description of the air flow system may be found in copending application Ser. No. 214,638 (now U.S. Pat. No. 3,792,919), filed on even date herewith by William A. Holmes et al.

Turning now to the construction of tension regulator 48, it may be seen from FIGS. 2-5 that the tension regulator includes a pivot arm 76 having an integrally formed roller bearing 78 near one end thereof, roller 50 rotatably mounted on roller bearing 78, a mounting bearing 80 integrally formed near the opposite end of pivot arm 76, and an integrally formed resilient blade 82 extending from mounting bearing 80 at an acute angle to pivot arm 76 towards roller bearing 78. One skilled in the art will recognize that pivot arm 76, bearings 78 and 80, and resilient blade 82 readily lend themselves to being incorporated into a unitary molded plastic structure. While any suitable high strength plastic may be used, it is preferable to employ a composite material such as glass filled Nylon because of the stress imposed on the tension regulator during the processing mode of operation.

Figure 5:
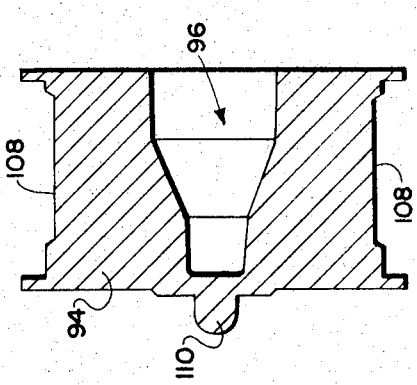
FIG. 5 is an enlarged cross-sectional view of the tension regulator roller taken along line 5—5 of FIG. 2.
Figure 3:
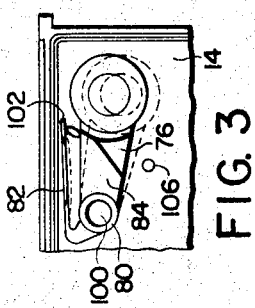
FIG. 3 is an elevational view of a section of the cassette housing showing the tension regulator in its initial position in solid lines and its energized position in dotted lines.
Figure 2:
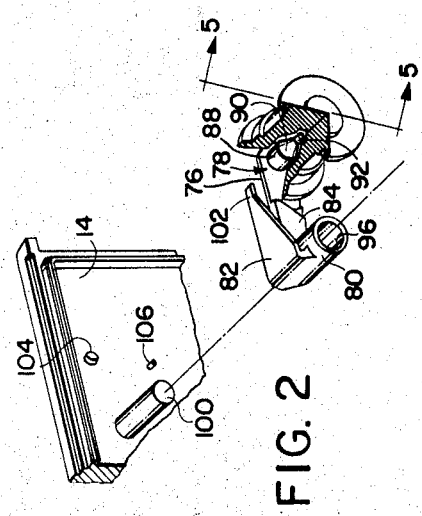
FIG. 2 is an exploded perspective view, partly in section, of the film strip tension regulator and means for mounting the tension regulator on a wall of the cassette housing.

As best shown in FIG. 2, pivot arm 76 is configured to include a relatively thick section 84 adjacent to mounting bearing 80 for stiffening pivot arm 78 to prevent torsional twisting thereof. Roller bearing 78 includes a cylindrical base section 88, a tapered intermediate section 90 configured to reduce in cross section until it meets a smaller cylindrical top section 92. As best shown in FIG. 5, the hub section 94 of roller 50 includes a bearing sleeve 96 generally conforming to the shape of roller bearing 78 for receiving the roller bearing to rotatably mount roller 50 on the end of pivot arm 76. It will be understood by those skilled in the art that roller bearing 78 and bearing sleeve 96 may also have other conforming shapes such as a cylinder, etc.

Pivot arm mounting bearing 80 may be formed to define a cylindrical sleeve 98 for receiving a cylindrical mounting post 100 which may be integrally formed with side wall 14 adjacent to supply reel 24.

As best shown in FIG. 2, resilient blade 82 is tapered to reduce in lateral cross section and one skilled in the art will appreciate that the function of the taper is to control the spring rate of the blade 82. When pivot arm 76 is mounted on post 100, the free end 102 of the blade bears against a first stop 104, which also may be integrally formed with side wall 14, thereby fixing the initial position of tension regulator 48.

As best shown in FIG. 1, when tension regulator is located in its initial position, roller 50 supports that portion of film strip 38 between supply reel 24 and idler or roller 52 in position to form a feed loop.

As the claw mechanism associated with the camera or projector engages the film strip at opening 22 and moves an incremental section from the feed loop into the exposure or projection station 64, the feed loop length decreases and the film strip deflects or pivots arm 76 in a clockwise direction (as viewed in FIG. 3) about mounting post 100 to an energized position shown in dotted lines. The clockwise pivoting action causes resilient blade 82 to bend or bow inwardly toward pivot arm 76 thereby storing energy in tension regulator 48 for its return from the energized position to the initial position. While the incremental section of film strip is held at station 64 for exposure or projection, the energy stored in blade 82 causes pivot arm 76 to pivot in a counterclockwise direction thereby causing roller 50 to replenish the feed loop by drawing a length of film strip from supply reel 24 as it returns to the initial position. Thus the tension regulator 48 serves to delay the rotation of supply reel 24 until an incremental section of the film strip has been moved into its position at station 64 thereby isolating that portion of the film strip near opening 22 from the inertial drag of supply reel 24. One skilled in the art will appreciate that such isolation serves to prevent tearing or deformation of the film strip sprocket holes 42 by the claw mechanisms and assures smooth transport of the film strip into the exposure or projection position.

Figure 4:
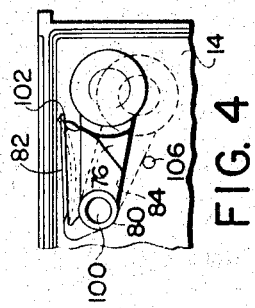
FIG. 4 is an elevational view of a section of the cassette housing showing the tension regulator in its initial position in solid lines and its stabilized terminal position in dotted lines.

As noted earlier, film strip 38 is processed or developed by activating the processing station and rapidly rewinding film strip 38 such that a thin uniform coating of liquid processing composition may be applied to emulsion side 40 at the applicator end 72 of dispenser 70. It is during this rapid rewind that tension within the film strip builds up to a maximum and causes maximum stress to be imposed on tension regulator 48. As best shown in FIGS. 2 and 4, a second stop 106 integrally formed with side wall 14 is provided below pivot arm 76 for limiting the path of travel of the pivot arm 76 thereby stabilizing the tension regulator in a terminal position (shown in dotted lines) beyond the energized position shown in FIG. 3. In addition to stabilizing pivot arm 76, stop 106 also relieves the strain on the inwardly bowed resilient blade 82 to prevent plastic deformation thereof. It will be noted that when pivot arm 76 is deflected to either the energized or terminal positions, the stress associated with bending resilient arm 82 is confined within pivot arm 76, mounting bearing 80 and blade 82 and is not transferred to mounting post 100. By minimizing the load on post 100 in this manner, it is possible to minimize the dimensions of post 100 and mounting bearing 80 and utilize a molded plastic structure for mounting tension regulator 48 on side wall 14.

Roller 50 may be molded of the same glass filled Nylon material as pivot arm 76 or some other suitable plastic material and is configured to include a recess 108 in the exterior surface of hub section 94. As mentioned earlier, in the preferred embodiment, film strip 38 is adapted to pass around roller 50 with its emulsion side 40 facing inwardly towards hub section 94. The function of recess 108 is to prevent contact between the liquid coating which is applied to the central portion of the film strip emulsion side 40 and the roller 50 as the tension regulator guides the film strip onto the supply reel during processing and subsequent rewind operations. Likewise, rollers 52 and 54 may be provided with a similar recess to prevent contact with the coating of liquid processing composition.

Roller 50 may also be provided with a protrusion 110 extending outwardly from its top surface which is adapted to bear against a third stop 112 integrally formed with cassette side wall 18 when tension regulator 48 is located at its terminal position. The purpose of protrusion 110 and stop 112 is to limit the torsional twisting of pivot arm 76 during rapid rewind thereby cooperating with the relatively thick pivot arm section 84 to relieve strain on roller bearing 78, mounting bearing 80 and mounting post 100.

As can be seen from FIG. 2, tension regulator 48 is ideally constructed for automated assembly and mounting. Assembly is accomplished simply by inserting roller bearing 78 into roller bearing sleeve 96. Once assembled, the tension regulator may be mounted in cassette 10 by coupling mounting bearing 80 to mounting post 100 such that the free end 102 of blade 82 bears against stop 104.

In operation, cassette 10 is mounted in a motion picture camera for exposing film strip 38. Image bearing light provided by the camera lens is directed through opening 22 onto film strip 38 as the claw mechanism progressively transports incremental sections of the film strip from the feed loop past exposure station 64 towards take-up reel 26 which is driven in a counterclockwise direction to collect the advancing film strip. In response to a length of film strip being transported from the feed loop toward station 64 tension regulator 48 moves from its initial position to its energized position and then back to its initial position thereby replenishing the feed loop from supply reel 24. This operating cycle continues as another length of film strip is moved towards station 64 such that tension regulator 48 reciprocates between the initial and energized positions for continuously forming a feed loop between supply reel 24 and opening 22. Thus tension regulator 48 is configured for reciprocating movement between an initial position and an energized position in response to progressively transporting the film strip in a first direction, i.e., from the supply reel 24, past station 64, towards take-up reel 26.

After exposure, the cassette 10 may be immediately transferred to a projector for film processing and projection. During the processing mode of operation, film strip 38 is rapidly transported from the take-up reel 26 past the activated dispenser 70 for coating and is then guided onto supply reel 24 by roller 50. By rapidly transporting the film strip in a second direction, i.e., towards supply reel 24, tension regulator 48 moves from its initial position to its terminal position where stop 106 stabilizes pivot arm 76 such that roller 50 rotates at a fixed position (See FIG. 4) and does not oscillate which may cause the coating on emulsion side 40 to be disturbed. Thus cassette 10 is provided with a tension regulator 48 which is configured for movement from an initial position to a terminal position in response to progressively transporting the film strip in a second direction for stabilizing the tension regulator 48 to insure that the liquid coating on the film strip is not disturbed as the tension regulator 48 guides the film strip onto the supply reel 24.

Simultaneously with applying the liquid processing composition to film strip emulsion side 40, air may be blown through air inlet 71 to enhance drying.

Development of the film strip 38 is completed in a relatively short time such that the film strip may be advanced almost immediately from supply reel 24 past projection station 64 for projection. As incremental sections of the developed film strip are progressively transported to the projection position, prismatic lens 56 directs light rays from a projection lamp associated with the projector towards and through the film strip and then outwardly through opening 22 such that the light rays may be projected onto a viewing screen.

An example of a projector suitable for use with film handling cassette 10 may be found in the copending applications of Edwin H. Land, Ser. No. 174,375, filed on Aug. 24, 1971 (now abandoned and replaced by copending application Ser. No. 371,146 filed on June 18, 1973) or copending application Ser. No. 384,382 filed July 31, 1973, and assigned to the same assignee as the present invention.

As during the exposure mode of operation, tension regulator 48 reciprocates between its initial and energized position in response to progressively transporting film strip 38 in the first direction for projection thereby continuously forming the feed loop of film strip 38 intermediate the supply reel 24 and opening 22 for isolating that portion of the film strip near opening 22 from the inertial drag of supply reel 24.

Idler 54 may be configured such that its rotation may be selectively arrested during exposure and projection modes of operation, respectively, by suitable elements in the camera and projector to provide "snubbing action". Also, it will be understood that in other embodiments of this invention employing a different location for dispenser 70, or possibly a more compact dispenser located between supply reel 24 and opening 22, tension regulator 48 may be positioned near the corner of cassette housing 12 occupied by roller 52.

In summary, a multi-purpose film handling cassette has been provided which includes a compact tension regulator that lends itself to molded plastic construction and automated assembly and mounting within the cassette housing. The tension regulator includes a pivot arm having an integrally formed roller bearing, a roller, an integrally formed mounting bearing, and an integrally formed resilient blade for biasing the regulator toward its initial position. During exposure and projection operations the tension regulator is responsive to film movement in a first direction for establishing a feed loop of film strip by moving between initial and energized positions. In response to moving the film strip in a second direction during a processing mode of operation, the tension regulator is configured to move from the initial position beyond the energized position to a terminal position where the tension regulator is stabilized and may guide the film strip onto a supply reel without disturbing a coating of liquid processing composition on the film strip.

The present invention provides an alternative embodiment for stabilizing the tension regulator within a multi-purpose film handling cassette.

In the preferred alternative embodiment, the cassette does not include an integral stop 106 for immobilizing the film strip tension regulator 48. The stop, or immobilizing device, is located in a motion picture viewer or projector.

A modified cassette 200 (See FIG. 7) adapted for use with a motion picture viewer/processor 300 (See FIG. 8) is essentially the same as the cassette 10 shown in FIG. 1 except that stop 106 is removed from cassette side wall 14, and an access opening 202 is provided in cassette side wall 18 in alignment with the location formerly occupied by stop 106. It is through this opening 202 that the apparatus immobilizing device is inserted to stabilize the tension regulator 48 in its terminal position shown in dotted lines in FIG. 4 of the drawings. A light seal 204 is provided for opening 202 and will be described later.

Another minor difference in the illustrated cassette 200 is that it includes a locating hole 206 in side wall 18 for receiving a locating pin in the projector 300. It will be understood that cassette 10 may include a similar locating hole 206.

For the sake of brevity, the component parts of cassette 200 that are common to cassette 10 will retain their same numerical designation as shown in FIGS. 1–6. The component parts or openings that are different will carry the designation 202, 204, and 206.

Figure 8:
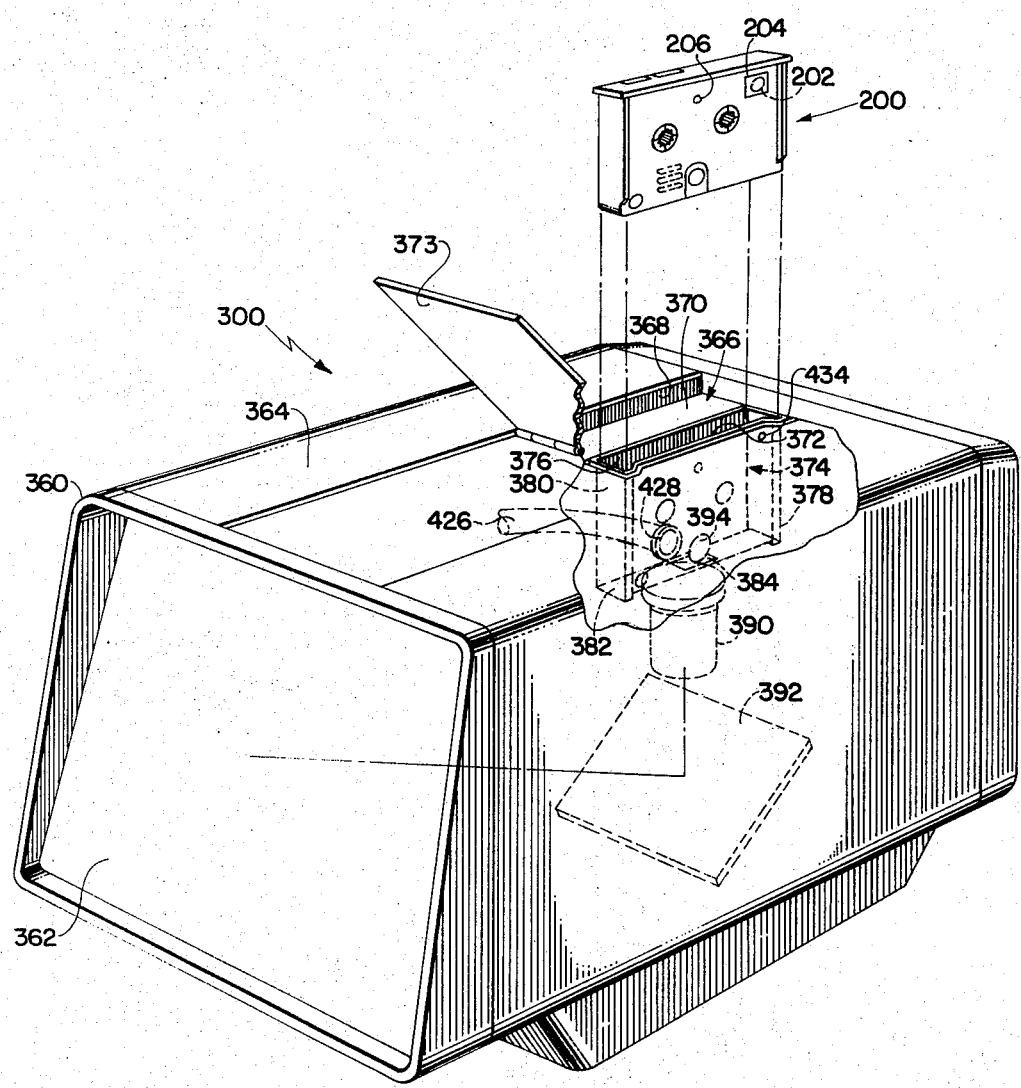
FIG. 8 is a perspective view of the cassette of FIG. 7 and a motion picture projector (shown with a portion cut away) for receiving such a cassette.

The projector or viewer 300 for processing and projecting the film strip in cassette 200 is best shown in FIG. 8 and preferably includes a generally box-like housing 360 formed, in part, by a rear projection screen 362.

Located in a top wall 364 of housing 360 is a generally rectangular shallow depression 366 formed by four depending side walls 368 and a bottom wall 370 joined to the bottom edges of depending side walls 368. Bottom wall 370 has an elongated access slot 372 therein through which cassette 200 may be inserted into and withdrawn from projector 300. In order to cover depression 366 and slot 372 when the projector 300 is not in use, a hinged door 373 may be provided as shown in FIG. 8.

Communicating with access slot 372 is a generally parallelepiped shaped chamber 374 for receiving and supporting cassette 200 in an operative position for film handling operations. Chamber 374 is formed by a pair of opposed side walls 376 and 378, a pair of opposed end walls 380, and a bottom wall 382 having an opening 384 therein which is adapted to be aligned with the opening 22 in the bottom peripheral section 20 of the cassette 200 when it is fully inserted in chamber 374.

Positioned below bottom chamber wall 382 and in alignment with opening 384 therein are projection means which include an aperture plate (not shown) and claw mechanism 385 (See FIG. 9) for engaging and transporting the film strip, a rotary shutter (not shown), and a projection lens 390. Positioned below lens 390 and disposed in an oblique plane with respect to the optic axes of the lens is a mirror 392 for reflecting light from the lens to the rear of projection screen 362. The light for projection is provided by a projection lamp (not shown) which is adapted to be mounted behind an opening 394 in the chamber side wall 378 which is disposed to be in alignment with the prism opening 66 when cassette 200 is fully inserted in chamber 374.

Figure 9:
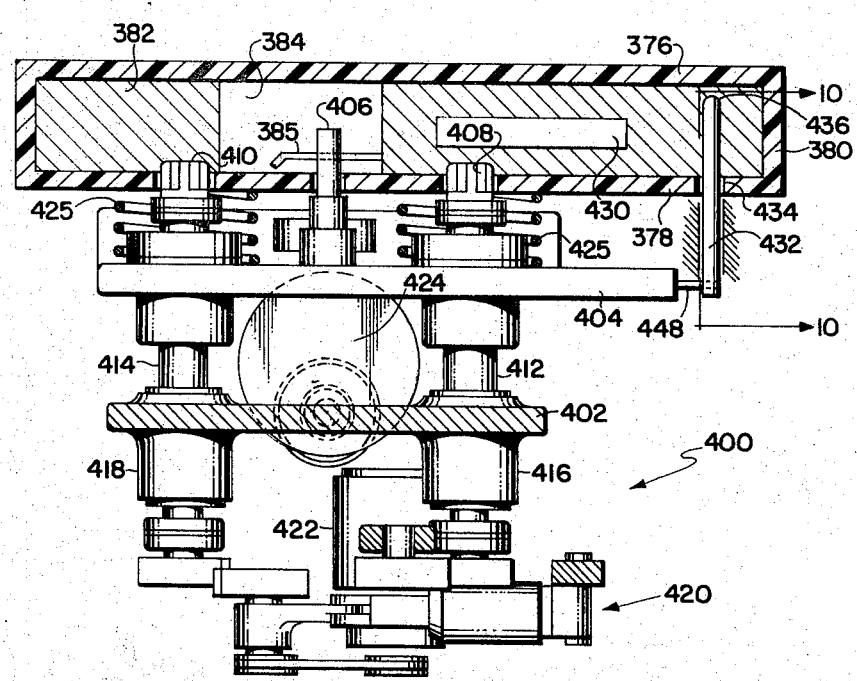
FIG. 9 is an elevational view of a film transport mechanism and tension regulator immobilizing device of the projector shown in FIG. 8.

Projector 300 is preferably provided with a cassette latching and reel drive mechanism 400 mounted adjacent to side wall 378 of chamber 374. One embodiment of such a mechanism 400 is shown in FIG. 9 to include a fixed support plate 402 and a movable support plate 404 mounted between support plate 402 and chamber side wall 378 for movement toward and away from chamber 374.

Mounted on the movable plate 404 facing chamber 374 is a fixed locating and latching pin 406, a pair of rotatably mounted reel drive spindles 408 and 410, and a snubbing mechanism (not shown).

The drive spindles 408 and 410 are coupled by extensible telescoping shafts 412 and 414, respectively, to a pair of spindle drive units 416 and 418 which are fixedly mounted on support plate 402. Also supported by plate 402 is a movable power transmission mechanism 420 which may be selectively coupled to either of the spindle drive units to apply power from a motor 422 thereto.

The movable support plate 404 is adapted to be driven towards and away from chamber side wall 378 by a motor driven off axis cam 424 and cooperating spindle biasing springs 425.

As best shown in FIG. 8 chamber side wall 378 includes appropriate openings to allow passage therethrough of pin 406, drive spindles 408 and 410, and the snubbing mechanism, respectively, when movable support plate 404 is driven towards chamber side wall 378.

Projector 300 is also preferably equipped with an air blowing system for providing a flow of air through the cassette housing 12 during processing and projection operations to enhance film drying and to cool the prism. An air blower (not shown) is coupled by an appropriate duct 426 to an air coupling member 428 (see FIG. 8) mounted in side wall 376 of chamber 374.

Preferably, coupling member 428 is spring biased towards wall 378 and extends into chamber 374 slightly such that it may be displaced towards side wall 376 as the cassette 200 is inserted into chamber 374. When the cassette is fully inserted into the chamber, coupling member 428 is adapted to be positioned over the air inlet 71 in side wall 14 of the cassette and held in abutment with side wall 14 by the biasing spring.

Another sub system of projector 300 is an ejection mechanism for partially extracting cassette 200 from chamber 374 through slot 372 such that the top portion of the cassette extends into depression 366. One type of ejection mechanism comprises a spring biased plate 430 which is located over bottom wall 382 of chamber 374. As the cassette is inserted, the ejection plate is depressed downwardly toward bottom wall 382, against the bias of the springs, and is locked in its down position by a foot (not shown) attached to movable plate 404 when this plate is moved to its operative position adjacent chamber side wall 378. When plate 404 is retracted, the foot releases the ejection plate 430 and it elevates the cassette to its partially ejected position. A more detailed explanation of this spring biased ejection plate may be found in the copending application of E. H. Land, Ser. No. 227,093 filed on Feb. 17, 1972.

Projector 300 also includes means for immobilizing the tension regulator 48 of cassette 200 in its stabilized terminal position shown in dotted lines in FIG. 4 of the drawings.

Figure 10:
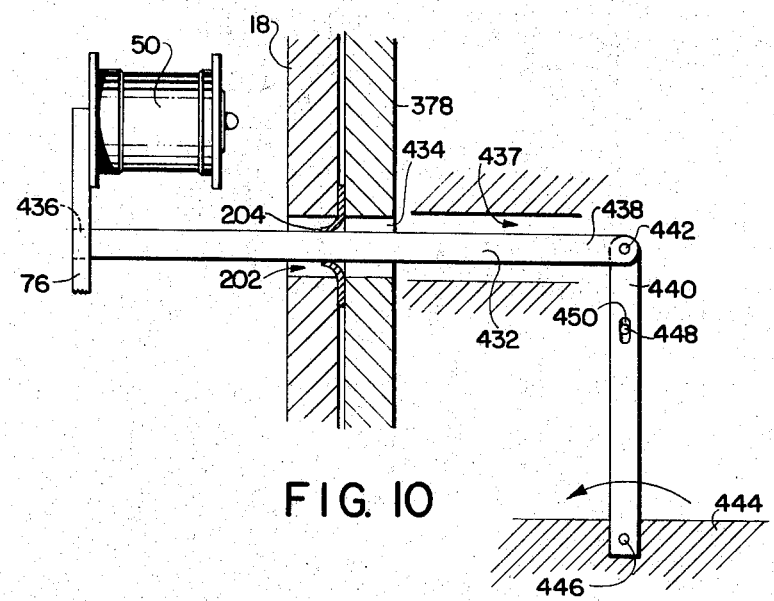
FIG. 10 is an elevational view of the tension regulator immobilizing device taken along lines 10—10 of FIG. 9.

Such an immobilizing means preferably takes the form of a metal pin 432 which is movably mounted for sliding motion through a hole 434, in chamber side wall 378, that is in alignment with the access opening 202 in cassette side wall 18 (See FIGS. 9 and 10). When pin 432 is fully inserted into chamber 374, its leading end 436 is positioned below arm 76 of tension regulator 48 in the same location as stop 106 in cassette 10.

As noted earlier, cassette access opening 202 is light sealed by a light seal 204 to prevent light from entering opening 202 and exposing the film strip 38 before it is processed or developed. In a preferred embodiment, light seal 204 is an opaque plastic or paper patch that is adhesively sealed to the exterior of cassette side wall 18 in covering relation to opening 202. When pin 432 advances through hole 434, it ruptures seal 204 and then extends into cassette 200 to its fully inserted position. Once the film strip has been processed it is no longer necessary to light seal cassette opening 202.

In a preferred embodiment, pin 432 is mounted in a hollow guide channel 437 in alignment with hole 434 for sliding movement into and out of a cassette 200 located at its fully inserted position in chamber 374.

The trailing end 438 of pin 432 is pivotally connected to the upper end of a pivot link 440 at pivot 442. The lower end of link 440 is pivotally coupled to a fixed support member 444, within projector 300, at pivot 446. As link 440 is pivoted about pivot 446, towards chamber side wall 378, it drives the immobilizing pin 432 into cassette 200. As link 440 is pivoted away from chamber wall 378 (clockwise as viewed in FIG. 10) it retracts pin 432 from cassette 200.

In a preferred embodiment, link 440 is coupled to the movable support member 404 by means of a connecting pin 448 which is fixedly secured to the end of support member 404 and extends through a slot 450 in link 440, intermediate pivots 442 and 446.

By this arrangement, the immobilizing pin 432 moves in response to moving the film drive means 408 and 410 and the locating pin 406 into and out of engagement with cassette 200. It will be noted that pin 432 must move further into cassette 200 than locating pin 406 and the link 440 provides the necessary amplification of movement.

Control over the sequence of operation of the various subsystems and components within projection 300 is accomplished by an electronic logic circuit (not shown). In a preferred embodiment, actuation of the electronic logic circuit is accomplished in response to the cassette, having exposed film therein, being fully inserted into chamber 374. For this purpose a normally open switch (not shown) positioned near the bottom of chamber 374 so as to be engaged and rendered closed by the bottom peripheral section 20 of cassette 200 as it approaches its operative position.

The closing of the switch and the actuation of the control circuit causes the motor driving cam 424 to be energized, thereby driving movable plate 404 towards chamber side wall 378. Pin 406 enters cassette opening 206 and serves, 1) to locate the cassette 200 at its final operative position in chamber 374 such that the drive spindles 408 and 410 following pin 406 may be accurately located and engage the hubs of the supply and take-up reel through openings 36 in cassette side wall 18; 2) to latch cassette 200 in its final operative position; and 3) to activate the normally inoperative processing station 70 within the cassette.

As movable support plate advances locating pin 406 in engagement with cassette 200, it also drives pin 432 into the cassette 200 through the connecting pin 448 and link 440. When movable plate 404 reaches the end of its forward path of travel towards chamber 374, the immobilizing pin 432 is in its fully inserted position with its leading end 436 positioned below arm 76 of the tension regulator 48 for immobilizing the tension regulator during the processing mode of operation.

After plate 404 has been moved into its operative position, the control circuit controls a sequence of operations in which the air supply is turned on, the supply reel drive 408 is energized, and the exposed film is rewound, in a continuous manner, from the take-up reel 26, past the cassette processing station 70 wherein an applicator applies a thin layer of fluid processing composition to the exposed photosensitive emulsion side of the film strip, and onto the supply reel 24.

It is during this rewind/processing operation that tension in the film strip builds up to a maximum causing the tension regulator 48 to deflect downwardly to its terminal position where it is supported and immobilized by the leading end 436 of pin 432. By immobilizing regulator 48 it cannot induce vibrations and/or erratic motion to the film strip.

Development of the latent images in the film strip is accomplished very rapidly such that the film may be driven forwardly for projection almost immediately after the rewind operation.

At this point the control circuit turns on the projection lamp, energizes the take-up reel drive 410, and actuates the claw mechanism 385 for transporting the film (in an intermittent manner) in incremental sections past the cassette opening 22 for projection. During the projection cycle, the tension regulator operates in the manner previously described and forms and maintains a feed loop of film strip between the supply reel 24 and the access opening 22.

After projection, the supply reel drive 408 is energized by the control circuit and the film strip is rewound onto supply reel 24.

The circuit then energizes the motor driving cam 424 and support plate 404 is moved away from side wall 378 of the chamber under the influence of springs 425 to disengage locating and latching pin 406, the reel drive spindles 408 and 410 and the immobilizing pin 432 from cassette 200.

In response to retracting plate 404, the ejection mechanism is actuated and it elevates the cassette to its partially ejected position. At this point, the control circuit turns off the projector.

It is intended that projector 300 be illustrative of a type of projector that is adapted to be used in a multi-purpose film handling cassette 200. The projector 300 has been described only to the extent necessary disclosure and properly support the inventive concept of providing a motion picture apparatus which includes means for stabilizing or immobilizing a film strip tension regulator located in the cassette to facilitate processing operations. A more detailed description of such a projector may be found in the copending application of E. H. Land, Ser. No. 384,382, filed on July 31, 1973, said copending application being assigned to the same assignee as the present invention.

It will be understood that the term "immobilizing the tension regulator 48" means that pivot arm 76 is arrested and cannot reciprocate or oscillate. Roller 50 remains free to rotate and guide the fluid coated film strip onto supply reel 24.

It is intended that the term motion picture apparatus should apply to a motion picture camera, as well as to a motion picture projector, if the camera is equipped to carry out the film processing operation rather than the projector. In this instance, the means for immobilizing the tension regulator would be located in such a camera.

By locating the tension regulator in the camera or, preferably, the projector, it may be constructed of a stronger (than plastic) material. While the immobilizer performs its most important function during processing, it also serves another useful function by limiting the strain on the tension regulator arm 76 and mounting post 100 during all film rewind operations. Also by eliminating the molded stop 106 from the cassette, the cassette is simplified and cost savings may be realized when the cassette is produced in volume.

In the illustrated embodiment, the means for immobilizing the tension regulator has been shown to include a movably mounted pin 432 which is inserted into the cassette to perform its immobilizing function.

It will be understood that it is within the scope of the present invention is to further modify the cassette and provide a fixed stop within the motion picture apparatus. For example, if the protrusion 110 on roller 50 were elongated and caused to extend through a crescent shaped opening (with suitable light shielding of course) in side wall 18, and if a V-shaped slot was provided in the chamber side wall 378 for receiving the extended protrusion, a low friction stop could be located at the bottom of the slot for supporting the protrusion when the tension regulator moved to its terminal position. The low friction stop (a plastic coated support surface for example) would immobilize the tension regulator and yet allow roller 50 to rotate.

In the illustrated embodiment of projector or viewer 300, the immobilizing pin 432 is in its fully inserted immobilizing position during the entire cycle of film transport. In some applications it may be desirable to have the pin 432 fully inserted only during the film processing or coating operation. In this instance, the pin 432 may be fitted on the end of a solenoid plunger which is normally de-energized with the plunger located in a retracted position. Just prior to the initiation of the processing operation, the solenoid may be energized by the automatic control circuit, causing the plunger to extend forwardly and insert the pin 432 into its fully inserted operative position. At the end of the processing cycle, the solenoid may be automatically de-energized to retract pin 432 from cassette 200.

In summary, a motion picture apparatus has been provided which includes means for immobilizing a film strip tension regulator in a multi-purpose film handling cassette. Preferably, the immobilizing means includes a movable mounted stop or pin which is inserted through an access opening in the cassette to immobilize the tension regulator in a stabilized terminal position. The immobilizing device is movable into and out of the cassette in response to moving a locating pin and/or a reel drive mechanism, both forming part of the apparatus, towards and away from such a cassette located at an operative position within the apparatus.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Motion picture apparatus comprising: an apparatus housing; means in said apparatus housing for receiving and supporting a multi-purpose film handling cassette at an operative position within said apparatus housing, the cassette being of the type including a cassette housing, a length of photographic film strip stored on a reel within the cassette housing; means providing access into the cassette housing for light to be directed toward an incremental section of the film strip as the film strip is transported, in an intermittent manner, past the access means to facilitate film exposure or projection operations, a processing station in the cassette housing past which the film strip is transported, in a continuous manner, during a processing mode of operation for coating at least an elongated portion of the film strip with a fluid processing composition and film strip tension regulating means movably mounted within the cassette housing and being engagable by the film strip for movement along a path of travel between initial and energized positions, in response to intermittently transporting the film strip past the access means, for forming and continuously maintaining a feed loop of film strip between the reel and the access means to isolate that portion of the film strip near the access means from an inertial drag of the reel, the tension regulating means also being movable, by the film strip, along the path of travel from the initial position past the energized position as the film strip is transported in a continuous manner during a film processing mode of operation, for guiding the fluid coated film strip towards the reel; said motion picture apparatus further including film transport means in said apparatus housing for transporting the film strip in the cassette housing past the access means of the cassette, in an intermittent manner, to facilitate exposure or projection operations and for transporting the film strip past the processing station of the cassette, in a continuous manner, to facilitate the application of the coating of fluid processing composition to the film strip; and stop means in said apparatus housing positionable in the path of travel of the film tension regulating means of the cassette for stopping movement of the film tension regulating means when the film tension regulating means moves past its energized position during the film processing mode of operation to assure that the film tension regulating means is stabilized and does not adversely affect the fluid coating applied to the film strip.

2. Motion picture apparatus comprising: an apparatus housing; means in said apparatus housing for receiving and supporting a multi-purpose film handling cassette at an operative position within said apparatus housing, the cassette being of the type including a cassette housing, a length of photographic film strip stored on a reel within the cassette housing; means providing access into the cassette housing for light to be directed toward an incremental section of the film strip as the film strip is transported, in an intermittent manner, past the access means to facilitate film exposure or projection operations, a processing station in the cassette housing past which the film strip is transported, in a continuous manner, during a processing mode of operation for coating at least an elongated portion of the film strip with a fluid processing composition, and film strip tension regulating means movably mounted within the cassette housing and being engagable by the film strip for movement along a path of travel between initial and energized positions, in response to intermittently transporting the film strip past the access means, for forming and continuously maintaining a feed loop of film strip between the reel and the access means to isolate that portion of the film strip near the access means from an inertial drag of the reel, the tension regulating means also being movable, by the film strip, along the path of travel from the initial position past the energized position as the film strip is transported in a continuous manner during a film processing mode of operation, for guiding the fluid coated film strip towards the reel; said motion picture apparatus further including film tranport means in said apparatus housing for transporting the film strip in the cassette housing past the access means of the cassette, in an intermittent manner, to facilitate exposure or projection operations and for transporting the film strip past the processing station of the cassette, in a continuous manner, to facilitate the application of the coating of fluid processing composition to the film strip; stop means in said apparatus housing positionable in the path of travel of the film tension regulating means of the cassette for stopping movement of the film tension regulating means when the film tension regulating means moves past its energized position during the film processing mode of operation to assure that the film tension regulating means is stabilized and does not adversely affect the fluid coating applied to the film strip; and means mounting said stop means for movement into such a cassette located at said operative position such that said stop means is located in position to stop movement of the tension regulating means during a processing mode of operation and for movement out of such a cassette so that the cassette may be removed from said operative position at the completion of film handling operations.

3. Motion picture apparatus as defined in claim 2 further including locating means mounted for movement into such a cassette for accurately locating the cassette at said operative position and for movement out of the cassette to allow the cassette to be removed from said operative position and means coupling said locating means to said stop means such that said stop means moves into and out of the cassette in response to moving said locating means into and out of the cassette.

4. Motion picture apparatus as defined in claim 2 wherein said film transport means includes reel drive means for driving the reel of such a cassette located at said operative position, said reel drive means being mounted for movement towards such a cassette located at said operative position for engaging and driving the reel, and for movement away from the cassette for disengaging said reel drive means from the reel and said apparatus further includes means coupling said stop means to said reel drive means such that said stop means is moved into and out of the cassette in response to moving said reel drive means towards and away from the cassette located at said operative position.

5. Motion picture apparatus as defined in claim 2 further including projecting means for projecting images on the film strip in a cassette located at said operative position.

6. Motion picture apparatus as defined in claim 5 further including a viewing screen for displaying images projected by said projecting means.

7. A film handling cassette comprising: a cassette housing; a reel within said cassette housing; a length of photographic film strip stored on said reel; means providing access for light to be directed towards an incremental section of said film strip as said film strip is transported, in an intermittent manner, past said access means to facilitate film exposure or projection operations; a processing station past which said film strip is transported, in a continuous manner, during a processing mode of operation for coating at least an elongated portion of said film strip with a fluid processing composition; film strip tension regulating means including a spring biased pivot arm coupled at one end to said cassette housing and having a roller for engaging said film strip rotatably mounted on an opposite end thereof, said tension regulating means being movable by said film strip along a predetermined path of travel between initial and energized positions for forming and maintaining a feed loop of said film strip between said reel and said access means, in response to intermittently transporting said film strip past said access means during film exposure or projection operations, to isolate that portion of said film strip near said access means from an inertial drag of said reel, said tension regulating means also being movable, past said energized position, in response to continuously transporting said film strip past said processing station for guiding said liquid coated film strip toward said reel; means defining an access opening in said cassette housing in alignment with a predetermined portion of the path of travel of said pivot arm of said tension regulating means and through which externally mounted stop means may be inserted into said cassette housing to locate the stop in said path of travel for stopping the movement of said pivot arm, during a processing mode of operation, so that said roller does not adversely affect the fluid coating applied to said film strip.

8. A film handling cassette as defined in claim 7 further including a light seal for said access opening for blocking light and thereby preventing such light from exposing said film strip.

* * * * *